United States Patent [19]

Boyd et al.

[11] 4,277,286
[45] Jul. 7, 1981

[54] LEAD-FREE GLASSES OF HIGH X-RAY ABSORPTION FOR CATHODE RAY TUBES

[75] Inventors: David C. Boyd, Corning; David A. Thompson, Horseheads, both of N.Y.

[73] Assignee: Corning Glass Works, Corning, N.Y.

[21] Appl. No.: 122,505

[22] Filed: Feb. 19, 1980

[51] Int. Cl.³ .......................... C03C 3/10; C03C 3/24
[52] U.S. Cl. .................................. 106/52; 252/478; 313/450
[58] Field of Search .................. 106/52, 54; 252/478; 313/480

[56] References Cited

U.S. PATENT DOCUMENTS

| | | | |
|---|---|---|---|
| 2,477,329 | 7/1949 | De Gier et al. | 106/52 |
| 2,527,693 | 10/1950 | Armistead | 106/52 |
| 3,464,932 | 9/1969 | Connelly et al. | 106/52 |
| 3,794,502 | 2/1974 | La Grouw | 106/52 |
| 3,805,107 | 4/1974 | Boyd | 106/52 |
| 3,808,154 | 4/1974 | Omori | 106/52 |
| 3,819,972 | 6/1974 | Sanner | 106/52 |
| 3,925,089 | 12/1975 | Houben | 106/52 |
| 3,987,330 | 10/1976 | Shell | 106/53 |
| 4,015,966 | 4/1977 | Weaver | 106/52 |
| 4,065,697 | 12/1977 | Steierman | 252/478 |
| 4,089,693 | 5/1978 | La Grouw et al. | 106/52 |

FOREIGN PATENT DOCUMENTS

| | | | |
|---|---|---|---|
| 870101 | 6/1961 | United Kingdom | 106/53 |
| 1123857 | 8/1968 | United Kingdom | 106/52 |
| 1231378 | 5/1971 | United Kingdom | 106/52 |

Primary Examiner—Herbert T. Carter
Assistant Examiner—Mark Bell
Attorney, Agent, or Firm—Clinton S. Janes, Jr.

[57] ABSTRACT

This invention is directed to glasses especially suitable for use as television picture tube faceplates which exhibit linear X-ray absorption coefficients at 0.6 Å of at least 35 cm$^{-1}$ and very little browning from X-radiation and electron impingement thereon. The glasses are essentially free from PbO and other readily-reducible metal oxides and consist essentially, in weight percent on the oxide basis, as calculated from the batch, of:

| | | |
|---|---|---|
| | $SiO_2$ | 43–55 |
| | $Al_2O_3$ | 0–4 |
| | ZnO | 5–12 |
| | $Li_2O$ | 0.5–3 |
| | $Na_2O$ | 4–8 |
| | $K_2O$ | 3–8 |
| $Li_2O + Na_2O +$ | $K_2O$ | 10–18 |
| | CaO | 0–5 |
| | SrO | 2–14 |
| | BaO | 10–20 |
| $CaO + SrO +$ | BaO | 16–30 |
| | $CeO_2$ | 0.3–1 |
| | $ZrO_2$ | 2–8 |

3 Claims, 6 Drawing Figures

1

LEAD-FREE GLASSES OF HIGH X-RAY ABSORPTION FOR CATHODE RAY TUBES

BACKGROUND OF THE INVENTION

It is well recognized that the operation of a television picture tube, one form of a cathode ray tube, involves the emission of a beam of electrons from a cathode. The conventional television receiver tube consists of three principal parts: an electron emitting means, an envelope for containing the electron emitting means, and a faceplate through which the picture is viewed, which is attached to the envelope (also referred to as the funnel). The beam of electrons moves over a screen on the faceplate to selectively activate points or dots of phosphor applied to the inside surface of the faceplate to thereby create an image. This bombardment of the phosphor by the stream of electrons causes the production of X-radiation, an undesirable side effect.

The safety of the picture viewer dictates that the electrons and X-rays be confined within the television tube. The faceplate portion of the tube presents a problem since it must remain clear and transparent to the viewer. The problem has intensified in recent years as higher voltages have been used to generate the electrons. Present government regulations restrict the transmittance of X-ray radiation to not more than 0.5 milliroentgen per hour (mr/hr) measured at 5 cm from the faceplate. Accordingly, research has been constant to devise glass compositions for faceplates which provide the necessary absorption of X-radiation while retaining the desired visible transmission therethrough.

Lead oxide (PbO) is well-known for its capability of absorbing X-radiation. Unfortunately, however, electron bombardment of glasses containing substantial quantities of PbO gives rise to a serious discoloration which has been termed "browning". Such discoloration is not only unpleasing aesthetically but it also reduces the visible transmission of the faceplate and, in the case of color television, deleteriously affects the color of the picture.

It has been appreciated that this browning may be the result of either X-radiation or electron impingement on the glass, or from both actions. U.S. Pat. No. 2,477,329 describes the addition of cerium oxide ($CeO_2$) to faceplate glass compositions to inhibit X-radiation discoloration and the essential elimination of easily reducible oxides from the compositions, referring explicitly to lead oxide, to minimize electron browning. The patent teaches the substitution of barium oxide (BaO) for PbO. British Pat. No. 870,101 discloses the beneficial effect which the combination of $CeO_2$ and titanium dioxide ($TiO_2$) has upon inhibiting X-ray browning. The addition of $TiO_2$ permits the amount of $CeO_2$ to be minimized, thereby reducing cost.

U.S. Pat. No. 2,527,693 discloses glasses having compositions within the alkali metal oxide-barium oxide-aluminum oxide-silica ($R_2O$-BaO-$Al_2O_3$-$SiO_2$) system which have formed the basis for commerically-used television tube faceplates. Nevertheless, as the tube voltages have increased, glasses exhibiting greater capacity for absorbing X-radiation and greater resistance to electron and X-ray browning have been sought. One proposal for solving the problem has involved utilizing larger amounts of BaO in the glass composition (British Pat. No. 1,123,857 and British Pat. No. 1,231,378). Unfortunately, when sufficient BaO was included to satisfy the X-ray absorption requirements, glass melting problems developed and the liquidus temperature was raised sharply.

U.S. Pat. No. 3,464,932 describes glasses in the $R_2O$-$Al_2O_3$-$SiO_2$ field containing strontium oxide (SrO). SrO exhibits a greater capacity for absorbing X-radiation having wavelengths within the range of 0.35–0.77 Å than does BaO. SrO, like BaO, is resistant to electron browning.

However, with the advent of television projection systems, i.e., the picture is projected onto a large screen spaced away from the television tube, still higher operating voltages have been damanded with consequent greater X-ray and electron emissions. Thus, the present glasses utilized in the manufacture of television tube faceplates in the United States rely upon SrO as the primary X-ray absorber. X-radiation absorption is limited to a linear X-ray absorption coefficient of about 25 $cm^{-1}$ at a wavelength of 0.6 Å which corresponds to a SrO content of approximately 14% by weight SrO. Concentrations of SrO in excess of about 14% hazard crystallization of strontium silicate as the molten glass is cooled. This situation has led to the need for a second glass faceplate which absorbs radiation passing through the first faceplate or the use of a much thicker-walled single faceplate. Both of those alternative solutions to the problem are unattractive commercially since they require redesign of the projection unit.

Total X-ray absorption comprises the product of faceplate thickness and linear absorption coefficient. It has been determined that satisfactory X-ray absorption with faceplates of the same thickness as the present commercial faceplates could be achieved with glasses having linear X-ray absorption coefficients at 0.6 Å of at least 35 $cm^{-1}$ and, preferably, in the vicinity of 40 $cm^{-1}$. Such glasses insure that X-ray transmittance will be less than 0.5 mr/hr when measured at a distance of 5 cm from a faceplate of conventional thickness.

OBJECTIVE OF THE INVENTION

The primary objective of the instant invention is to provide glasses suitable for use as faceplates for cathode ray tubes, and particularly for television picture tubes, which exhibit linear X-ray absorption coefficients at 0.6 Å of at least 35 $cm^{-1}$ and which strongly resist the development of X-ray and electron browning.

SUMMARY OF THE INVENTION

To be useful as a faceplate, a glass must possess certain electrical and physical properties. Thus, the electrical resistivity of the glass, when measured at 350° C. must be at least $10^7$ ohm-cm. Also, to be compatible with conventional tube processing operations, especially sealing of the faceplate to the funnel and bakeout, the glass will desirably exhibit a coefficient of thermal expansion (0°–300° C.) not in excess of $102 \times 10^{-7}/°C.$, preferably between about $95–100 \times 10^{-7}/°C.$, an internal liquidus under 900° C., a strain point not over 500° C., and a softening point not over 690° C.

Glasses manifesting those electrical and physical properties, while achieving the above-cited primary objective of the invention, can be produced from compositions in the $R_2O$-RO-ZnO-$ZrO_2$-$SiO_2$ system wherein $R_2O$ consists of $Li_2O$+$Na_2O$+$K_2O$ and RO consists of SrO and BaO. Up to 4% $Al_2O_3$ and up to 5% CaO may optionally be present to modify the physical properties of the glasses. $CeO_2$ and, optionally, $TiO_2$ are also included in minor amounts to inhibit discoloration via X-radiation. Accordingly, the inventive base glass compositions consist essentially, expressed in weight percent on the oxide basis as calculated from the batch, of 0.5–3% $Li_2O$, 4–8% $Na_2O$, and 3–8% $K_2O$, the sum $Li_2O+Na_2O+K_2O$ being 10–18%, 2–14% SrO, and 10–20% BaO, the sum $CaO+SrO+BaO$ being 16–30%, 5–12% ZnO, 2–8% $ZrO_2$, and 43–55% $SiO_2$. $CeO_2$ in amounts ranging from 0.3–1% and, optionally but desirably, $TiO_2$ in amounts varying from 0.5–2% will be included in the base composition to inhibit X-ray browning. As noted above, $TiO_2$ exerts a supplemental effect to $CeO_2$ in reducing X-ray discoloration and thereby minimizes the amount of costly $CeO_2$ which must be present. Since $Sb_2O_3$ is less readily reduced than $As_2O_3$, its use as a fining agent instead of $As_2O_3$ is preferred.

The inventive compositions utilize a combination of BaO, SrO, ZnO, and $ZrO_2$ to provide the required X-ray absorption while exhibiting good glass stability, i.e., resistance to devitrification, and the necessary electrical and physical properties. PbO and other readily-reducible metal oxides are essentially absent from the glass compositions.

PRIOR ART

Figure 1A:
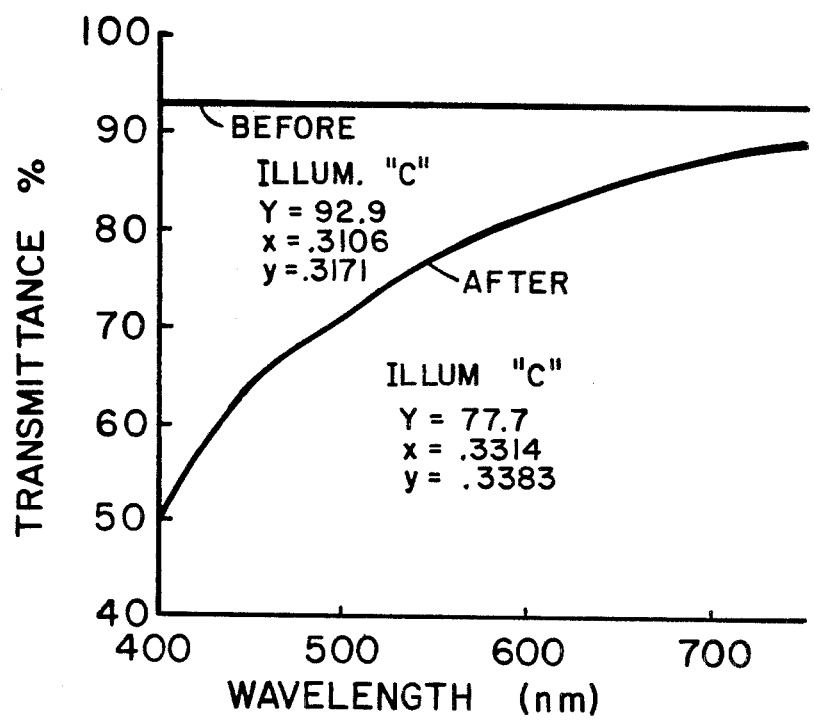
FIGS. 1a and 1b depict transmittance curves, utilizing a General Electric Recording Spectrophotometer No. 732983, made of a borosilicate glass containing no $CeO_2$ to inhibit X-ray browning.

U.S. Pat. No. 3,987,330 describes glass compositions suitable for the faceplate of color television picture tubes which exhibit a linear X-ray absorption coefficient at 0.6 Å of at least 27 cm$^{-1}$. Base compositions for the glasses consist essentially, in weight percent, of:

| $SiO_2$ | 60–65% |
|---|---|
| $Al_2O_3$ | 0.5–5 |
| $Na_2O$ | 5–10 |
| $K_2O$ | 5–10 |
| CaO + MgO | 2–10 |
| SrO | 4–10 |
| BaO | 1–5 |
| PbO | 1–5 |
| $ZrO^2$ | 0.5–5 |

Such glasses contained PbO as a required constituent and the highest linear absorption coefficient at 0.6 Å reported in the working examples is 28.7 cm$^{-1}$. The reported working examples contained 0.45–0.5% $TiO_2$ and 0.2–0.4% $CeO_2$ to inhibit discoloration under X-ray bombardment.

U.S. Pat. No. 4,015,966 teaches the production of SrO-containing glasses operable as faceplates for television picture tubes which can be drawn as sheet on a bath of molten tin in accordance with the float glass process and which demonstrate a linear X-ray absorption coefficient at 0.6 Å of at least 26 cm$^{-1}$. The compositions must be free from PbO, $As_2O_3$, and $Sb_2O_3$ and consist essentially, in weight percent, of:

| $SiO_2$ | 60–65% |
|---|---|
| $Al_2O_3$ | 0–5 |
| $Na_2O$ | 2–10 |
| $K_2O$ | 0–17 |
| CaO + MgO | 2–10 |
| BaO | 0–5 |
| SrO | 5–15 |
| $ZrO_2$ | 0–10 |
| $WO_3$ | 0–5 |
| $TiO_2$ | 0–1 |
| $CeO_2$ | 0–1 |
| $TiO_2 + CeO_2$ | 0.1–1 |
| $Fe_2O_3$ | 0–1 |

ZnO is not referred to in the specification and the $SiO_2$ and BaO contents are outside those operable in the present invention.

U.S. Pat. No. 4,089,693 discloses glass compositions suitable for the production of television picture tube faceplates statedly exhibiting greater X-ray absorption than the glasses being used commercially for that purpose. The operable ranges of composition consist essentially in weight percent, of:

| $SiO_2$ | 54–69% |
|---|---|
| $Na_2O$ | 6–10 |
| $K_2O$ | 5–10 |
| $Na_2O + K_2O$ | 14–20 |
| CaO | 0–4 |
| MgO | 0–2.5 |
| $Al_2O_3$ | 0–6 |
| $ZrO_2$ | 0–6 |
| $Al_2O_3 + ZrO_2$ | <6 |
| BaO | 8–18 |
| ZnO | 0–5 |
| $Sb_2O_3$ | 0–3 |
| $2ZrO_2 + BaO + ZnO + 4Sb_2O_3$ | >20 |
| $ZrO_2 + ZnO + Sb_2O_3$ | >3 |
| $As_2O_3$ | 0–0.3 |
| $Sb_2O_3 + As_2O_3$ | ≧0.3 |
| $CeO_2$ | 0.05–0.3 |

SrO is nowhere mentioned, the ZnO content is less than that demanded in the present inventive compositions, and the highest linear absorption coefficient in the working examples at 0.6 Å, as calculated from the components therein, is about 25 cm$^{-1}$.

DESCRIPTION OF THE PREFERRED EMBODIMENTS

Table I reports several compositions, expressed in parts by weight on the oxide basis as calculated from the batch, illustrating the parameters of the instant invention. Because the sum of the constituents totals or closely approximates 100, for all practical purposes the values recorded in Table I can be deemed to represent weight percent. The actual batch ingredients may comprise any materials, either an oxide or other compound, which, when melted together with the other components, will be converted into the desired oxide in the proper proportions. Also included in Table I are Compositions A and B which are analyses of two glasses presently being commercially marketed for television picture tube faceplates.

The batch ingredients were compounded, ballmilled together to aid in securing a homogeneous melt, placed in platinum crucibles, lids set on the crucibles, and the covered crucibles introduced into a furnace operating at 1550° C. After about six hours with occasional stirring, the molten batches were poured into steel molds 6"×6"×½" and the resultant slab immediately transferred to an annealer operating at 550° C.

Although the above description reflects laboratory melts, it will be appreciated that the exemplary compositions listed in Table I could be melted and formed in much larger quantities utilizing conventional commercial melting and forming practices. In the interest of economy, $CeO_2$ and $TiO_2$ were not included in several examples. Those ingredients are customarily utilized in such small amounts that they have little substantive effect upon X-ray absorption or other physical properties except the inhibition of X-ray browning.

TABLE I

| | 1 | 2 | 3 | 4 | 5 | 6 | 7 | 8 |
|---|---|---|---|---|---|---|---|---|
| $SiO_2$ | 52.6 | 49.82 | 49.64 | 50.16 | 50.41 | 52.74 | 49.63 | 53.84 |
| $Al_2O_3$ | 1.7 | 1.37 | 1.7 | 1.7 | 1.7 | 1.4 | 2.5 | 1.7 |
| $ZrO_2$ | 3.0 | 3.3 | 3.0 | 3.0 | 3.0 | 3.39 | 3.0 | 3.0 |
| ZnO | 7.6 | 7.63 | 10.6 | 8.6 | 7.6 | 7.83 | 7.6 | 7.6 |
| CaO | 1.8 | — | 1.8 | 1.8 | 1.8 | — | 1.8 | 1.8 |
| SrO | 3.4 | 6.94 | 3.4 | 5.4 | 6.4 | 7.12 | 6.4 | 3.4 |
| BaO | 14.9 | 18.48 | 14.9 | 14.9 | 14.9 | 14.75 | 14.9 | 14.9 |
| $Li_2O$ | 1.5 | 1.2 | 1.5 | 1.5 | 1.5 | 1.23 | 1.5 | 1.5 |
| $Na_2O$ | 6.5 | 5.81 | 6.5 | 5.98 | 5.7 | 5.96 | 5.7 | 6.3 |
| $K_2O$ | 5.1 | 7.25 | 5.1 | 5.1 | 5.1 | 7.38 | 7.3 | 4.1 |
| $TiO_2$ | 0.8 | — | 0.8 | 0.8 | 0.8 | — | 0.81 | 0.8 |
| $CeO_2$ | 0.66 | — | 0.66 | 0.66 | 0.66 | — | 0.66 | 0.66 |
| $Sb_2O_3$ | 0.4 | 0.39 | 0.4 | 0.4 | 0.4 | 0.39 | 0.4 | 0.4 |

| | 9 | 10 | 11 | 12 | 13 | 14 | 15 |
|---|---|---|---|---|---|---|---|
| $SiO_2$ | 53.34 | 52.84 | 47.94 | 53.81 | 45.82 | 51.5 | 53.15 |
| $Al_2O_3$ | 1.7 | 1.7 | 1.36 | 1.43 | 1.34 | 1.41 | 1.41 |
| $ZrO_2$ | 3.0 | 3.0 | 3.28 | 3.45 | 3.24 | 3.41 | 3.41 |
| ZnO | 7.6 | 7.6 | 9.75 | 10.27 | 9.64 | 10.14 | 5.63 |
| CaO | 1.8 | 1.8 | — | — | — | — | — |
| SrO | 3.4 | 3.4 | 6.9 | 7.26 | 9.55 | 10.04 | 12.91 |
| BaO | 14.9 | 14.9 | 18.39 | 10.75 | 18.17 | 10.62 | 10.62 |
| $Li_2O$ | 1.0 | 1.5 | 1.19 | 1.26 | 1.18 | 1.24 | 1.24 |
| $Na_2O$ | 6.3 | 6.3 | 5.78 | 6.08 | 5.71 | 6.01 | 6.01 |
| $K_2O$ | 5.1 | 5.1 | 7.22 | 7.48 | 7.16 | 7.35 | 7.42 |
| $TiO_2$ | 0.8 | 0.8 | — | — | — | — | — |
| $CeO_2$ | 0.66 | 0.66 | — | — | — | — | — |
| $Sb_2O_3$ | 0.4 | 0.4 | 0.39 | 0.41 | 0.39 | 0.41 | 0.41 |

| | 16 | 17 | 18 | 19 | 20 | A | B |
|---|---|---|---|---|---|---|---|
| $SiO_2$ | 51.7 | 49.23 | 52.23 | 52.1 | 47.13 | 64.9 | 69.3 |
| $Al_2O_3$ | 1.37 | 1.7 | 1.7 | — | 5.0 | 1.4 | 2.0 |
| $ZrO_2$ | 3.38 | 3.0 | 3.0 | 3.0 | 3.0 | — | — |
| ZnO | 5.48 | 7.6 | 7.6 | 7.6 | 7.6 | — | — |
| CaO | — | 3.0 | — | 1.8 | 1.8 | 0.45 | — |
| SrO | 6.98 | 6.4 | 6.4 | 6.4 | 6.4 | 14.8 | 13.0 |
| BaO | 18.9 | 14.9 | 14.9 | 14.9 | 14.9 | 0.3 | — |
| $Li_2O$ | 1.21 | 1.5 | 1.5 | 1.5 | 1.5 | 0.57 | 3.95 |
| $Na_2O$ | 5.84 | 5.7 | 5.7 | 5.7 | 5.7 | 6.9 | 4.09 |
| $K_2O$ | 7.28 | 7.3 | 7.3 | 7.3 | 7.3 | 7.3 | 5.78 |
| $TiO_2$ | — | 0.81 | 0.81 | 0.81 | 0.81 | — | — |
| $CeO_2$ | — | 0.66 | 0.66 | 0.66 | 0.66 | 0.76 | — |
| $Sb_2O_3$ | 0.4 | 0.4 | 0.4 | 0.4 | 0.4 | 0.2 | 0.39 |
| $B_2O_3$ | — | — | — | — | — | 1.5 | — |
| $As_2O_3$ | — | — | — | — | — | — | 0.05 |
| F | — | — | — | — | — | 0.54 | — |

Table II reports several measurements of electrical and physical properties determined on the glasses of Table I utilizing techniques conventional in the glass art. The softening point (Soft.), annealing point (Ann.), and strain point (Str.) are recorded in °C.; the coefficient of thermal expansion over the interval 0°–300° C. (Exp.) as $\times 10^{-7}$/°C.; the density (Den.) in $g/cm^3$; the Log Resistivity (Log $\rho$) is tabulated at 250° C. and 350° C.; the internal liquidus (Liq.) is recorded in °C.; and the linear X-ray absorption coefficient at 0.6 Å (Abs.) in $cm^{-1}$.

TABLE II

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Soft. | 666 | 671 | 661 | 666 | 671 | 676 | 671 | 674 | 688 | 670 | 664 | 678 | 663 | 674 | 671 | 672 |
| Ann. | 496 | 503 | 498 | 500 | 502 | 502 | 504 | 514 | 512 | 499 | 503 | 504 | 502 | 502 | 503 | 501 |
| Str. | 456 | 468 | 460 | 461 | 463 | 464 | 466 | 477 | 471 | 461 | 468 | 466 | 466 | 461 | 468 | 466 |
| Exp. | — | 97.7 | 97.3 | 97.0 | 98.4 | 94.2 | 97.4 | 93.0 | 85.2 | 97.4 | 92.2 | 100.7 | 94.3 | 96.7 | 98.0 | |
| Den. | 3.017 | 3.134 | 3.080 | 3.087 | 3.083 | 3.042 | 3.084 | 3.010 | 3.016 | 3.013 | 3.184 | 2.998 | 3.237 | 3.063 | 3.053 | 3.083 |
| Log $\rho$ 350 | — | 8.430 | 8.090 | 8.305 | 8.410 | — | — | — | 8.040 | 8.005 | 0.425 | 7.885 | 8.665 | 8.140 | — | — |
| Log $\rho$ 250 | — | 10.545 | 10.020 | 10.430 | 10.515 | — | — | — | 10.055 | 10.090 | 10.425 | 9.880 | 9.405 | 10.215 | — | — |
| Liq. | <725 | 886 | 809 | 847 | 863 | 856 | 842 | 700 | <600 | <700 | 886 | 835 | 890 | 872 | 877 | 874 |
| Abs. | 35.0 | 44.7 | 38.3 | 39.8 | 40.6 | 41.4 | 41.1 | 34.8 | 35.1 | 35.0 | 47.0 | 40.4 | 51.8 | 45.2 | 45.9 | 42.8 |

| | 17 | 18 | 19 | 20 | A | B |
|---|---|---|---|---|---|---|
| Soft. | 668 | 672 | 666 | 681 | 672 | 650 |
| Ann. | 506 | 498 | 504 | 517 | 491 | 460 |
| Str. | 468 | 458 | 477 | 485 | 452 | 425 |
| Exp. | 96.8 | 94.5 | 96.4 | 94.7 | 94.1 | 90.6 |
| Den. | 3.096 | 3.045 | 3.074 | 3.085 | 2.657 | 2.605 |
| Log $\rho$ 350 | 8.475 | 8.130 | 8.395 | 8.335 | — | 7.160 |
| Log $\rho$ 250 | 10.350 | 10.205 | 10.455 | 10.380 | — | 9.125 |
| Liq. | 880 | 819 | 823 | 892 | — | 865 |
| Abs. | 41.5 | 40.2 | 41.1 | 41.1 | 28.0 | 24.2 |

As is evident from a study of Tables I and II, the desired electrical, physical, and absorptive properties are accorded to the inventive glasses through a critical combination of components. The more desirable glasses consist essentially, expressed in weight percent on the oxide basis as calculated from the batch, of:

| | |
|---|---|
| $SiO_2$ | 48–53 |
| $Al_2O_3$ | 1–2 |
| ZnO | 7–11 |
| $Li_2O$ | 1–3 |
| $Na_2O$ | 5–7 |
| $K_2O$ | 5–6 |
| $Li_2O + Na_2O + K_2O$ | 11–16 |
| CaO | 0–3 |
| SrO | 3–7 |
| BaO | 14–16 |
| $CaO + SrO + BaO$ | 18–24 |
| $ZrO_2$ | 2–7 |
| $CeO_2$ | 0.4–0.8 |
| $TiO_2$ | 0.5–1.0 |

The most preferred embodiment of the inventive glass compositions is Example 5 since it exhibits a linear X-ray absorption coefficient in the vicinity of 40 $cm^{-1}$ and very little browning.

Figure 1B:
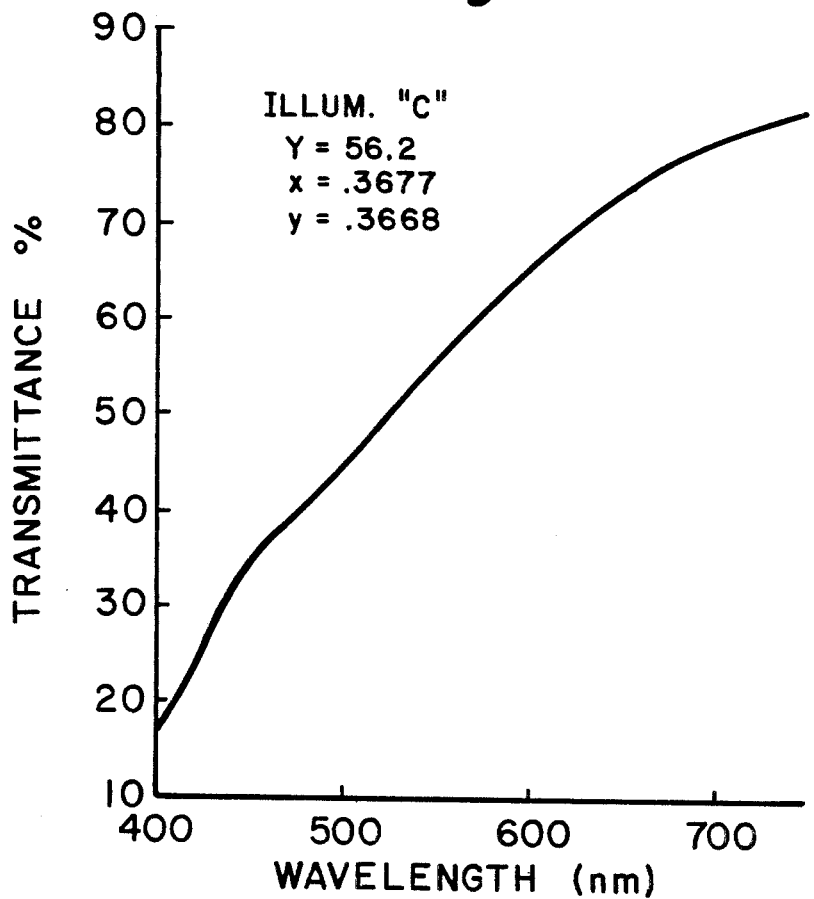

FIGS. 1a and 1b plot the visible transmittance spectra of samples about 6.3 mm thick of a sodium aluminoborosilicate glass containing no CeO2 to inhibit X-ray browning. FIG. 1a depicts the spectral transmittance before and after exposure to a 100,000 roentgen X-ray dosage simulating the X-ray portion of the browning that might occur within a television picture tube. FIG. 1b records the actual transmittance spectrum after an exposure of the glass for 2000 hours in an operational television picture tube. The chromaticity coordinates and the luminous transmittance of each specimen utilizing Illuminant "C" are also reported in the FIGURES.

Figure 2A:
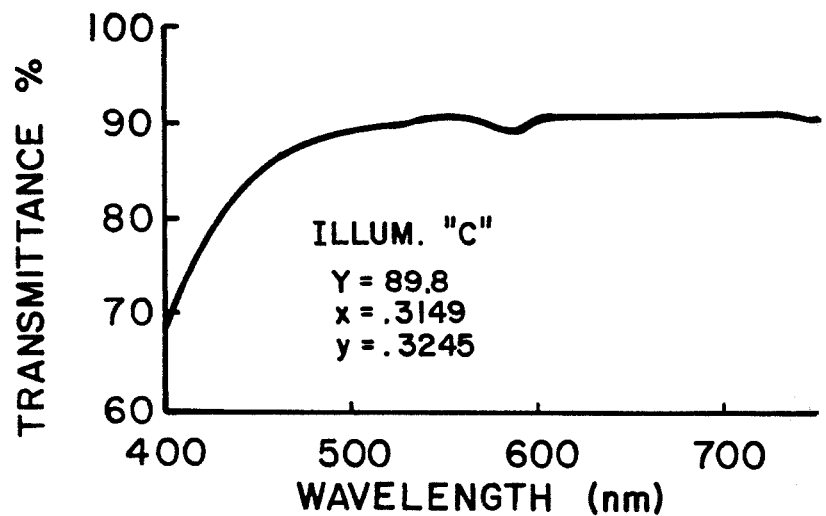
FIGS. 2a and 2b represent transmittance curves, utilizing a General Electric Recording Spectrophotometer No. 732983, made of a glass having a composition within the operable ranges of the instant invention.
Figure 2B:
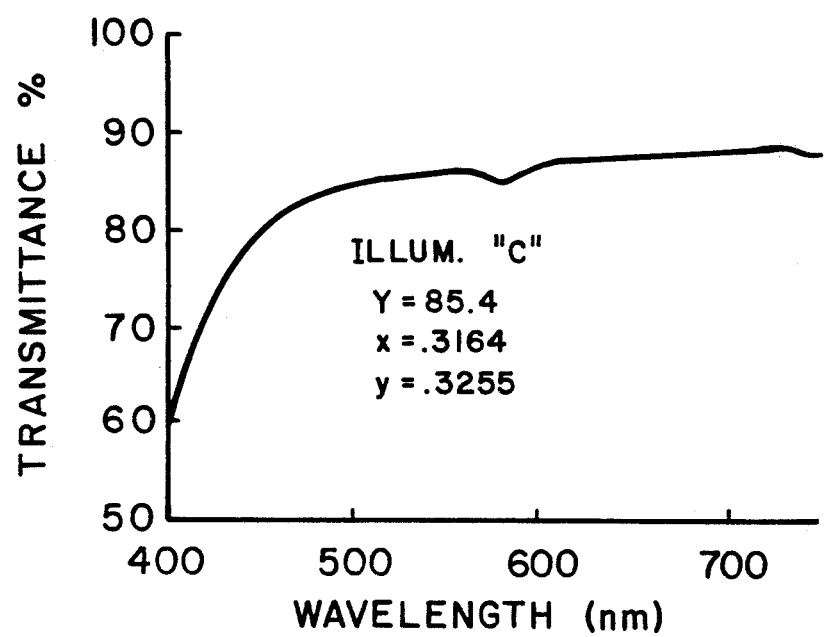

FIGS. 2a and 2b, respectively, set forth spectral transmittance curves determined on Example 1 of Table I before and after exposure to a 100,000 roentgen dosage. The chromaticity coordinates and the luminous transmittance of each specimen (about 6.3 mm thick) utilizing Illuminant "C" are also tabulated on the FIGURES.

Figure 3A:
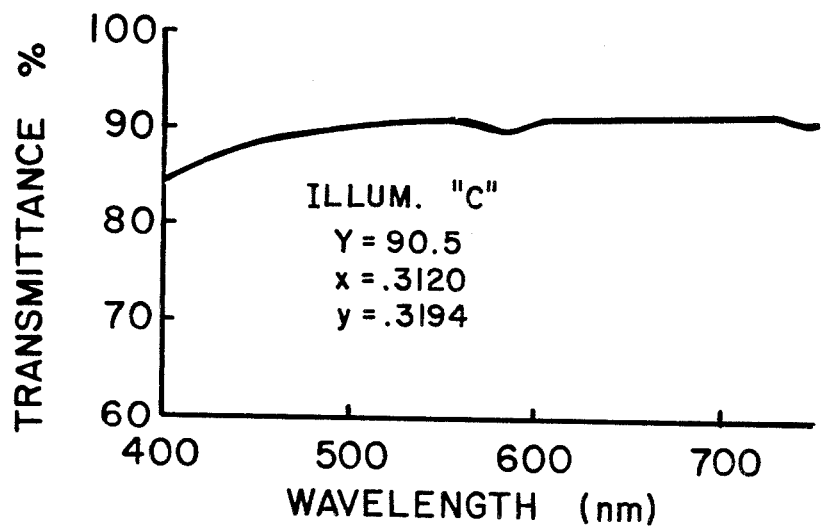
FIGS. 3a and 3b record transmittance curves, utilizing a General Electric Recording Spectrophotometer No. 732983, made of a glass having a composition within the operable ranges of the instant invention but containing no $TiO_2$.
Figure 3B:
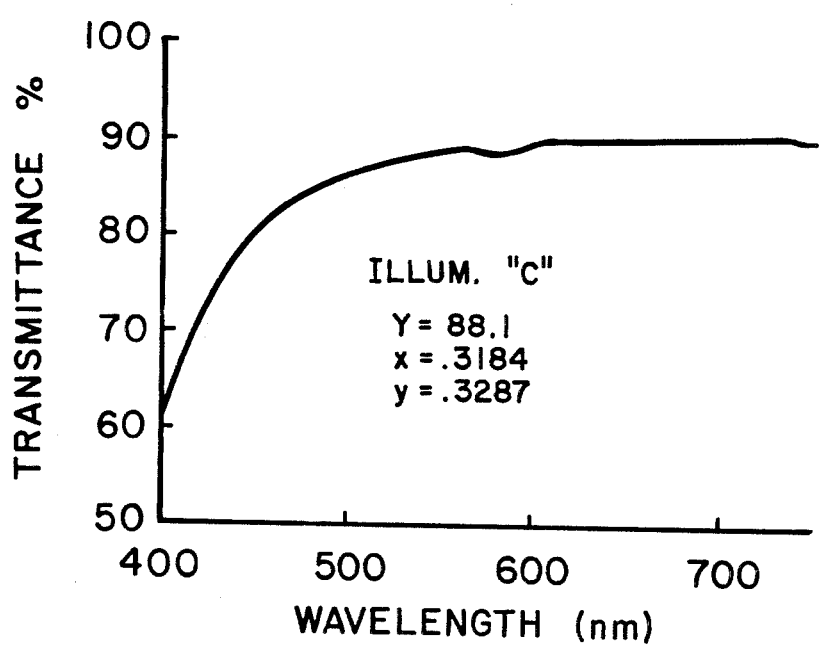

FIGS. 3a and 3b, respectively, represent spectral transmittance curves measured on a glass having the composition of Example 1 in Table I, but wherein $TiO_2$ was omitted, before and after a laboratory X-ray dosage of 100,000 roentgens. The chromaticity coordinates and the luminous transmittance of each specimen utilizing Illuminant "C" are also listed on the FIGURES. A comparison of FIGS. 2a and 2b with FIGS. 3a and 3b indicates a smaller decrease in luminous transmittance but a sharper change in chromaticity.

We claim:

1. A glass for the faceplate of a television picture tube essentially free from PbO and other readily-reducible metal oxides exhibiting an electrical resistivity, when measured at 350° C., of at least $10^7$ ohm-cm, a coefficient of thermal expansion (0°–300° C.) not in excess of $102 \times 10^{-7}/°C.$, an internal liquidus under 900° C., a strain point not over 500° C., a softening point not over 690° C., a linear X-ray absorption coefficient at 0.6 Å of at least 35 cm$^{-1}$ such that X-ray transmittance therethrough will be less than 0.5 mr/hr when measured at a distance of 5 cm from a faceplate of conventional thickness, and strong resistance of discoloration from X-ray and electron bombardment consisting essentially, expressed in weight percent on the oxide basis as calculated from the batch, of:

|  |  |  |
|---|---|---|
|  | $SiO_2$ | 43–55 |
|  | $Al_2O_3$ | 0–4 |
|  | ZnO | 5–12 |
|  | $Li_2O$ | 0.5–3 |
|  | $Na_2O$ | 4–8 |
|  | $K_2O$ | 3–8 |
| $Li_2O + Na_2O +$ | $K_2O$ | 10–18 |
|  | CaO | 0–5 |
|  | SrO | 2–14 |
|  | BaO | 10–20 |
| CaO + SrO + | BaO | 16–30 |
|  | $CeO_2$ | 0.3–1 |
|  | $ZrO_2$ | 2–8 |

2. A glass according to claim 1 also containing 0.5–2% $TiO_2$.

3. A glass according to claim 2 consisting essentially, expressed in weight percent on the oxide basis as calculated from the batch, of:

|  |  |  |
|---|---|---|
|  | $SiO_2$ | 48–53 |
|  | $Al_2O_3$ | 1–2 |
|  | ZnO | 7–11 |
|  | $Li_2O$ | 1–3 |
|  | $Na_2O$ | 5–7 |
|  | $K_2O$ | 5–6 |
| $Li_2O + Na_2O +$ | $K_2O$ | 11–16 |
|  | CaO | 0–3 |
|  | SrO | 3–7 |
|  | BaO | 14–16 |
| CaO + SrO + | BaO | 18–24 |
|  | $ZrO_2$ | 2–7 |
|  | $CeO_2$ | 0.4–0.8 |
|  | $TiO_2$ | 0.5–1.0 |

* * * * *

UNITED STATES PATENT AND TRADEMARK OFFICE
CERTIFICATE OF CORRECTION

PATENT NO. : 4,277,286

DATED : July 7, 1981

INVENTOR(S) : David C. Boyd et al.

It is certified that error appears in the above-identified patent and that said Letters Patent are hereby corrected as shown below:

Column 6, in Table II, under column 11, change "0.425" to -- 8.425 --.

Signed and Sealed this

Twenty-seventh Day of October 1981

[SEAL]

Attest:

GERALD J. MOSSINGHOFF

Attesting Officer     Commissioner of Patents and Trademarks